July 27, 1954 W. J. YOST 2,685,058
GEOPHYSICAL EXPLORATION BY ELECTRIC PULSES
Filed Aug. 27, 1949 4 Sheets-Sheet 1
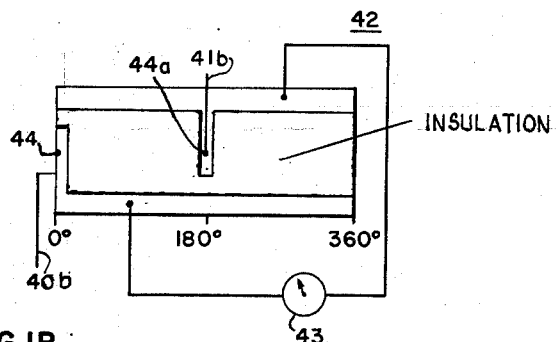
FIG.IB.
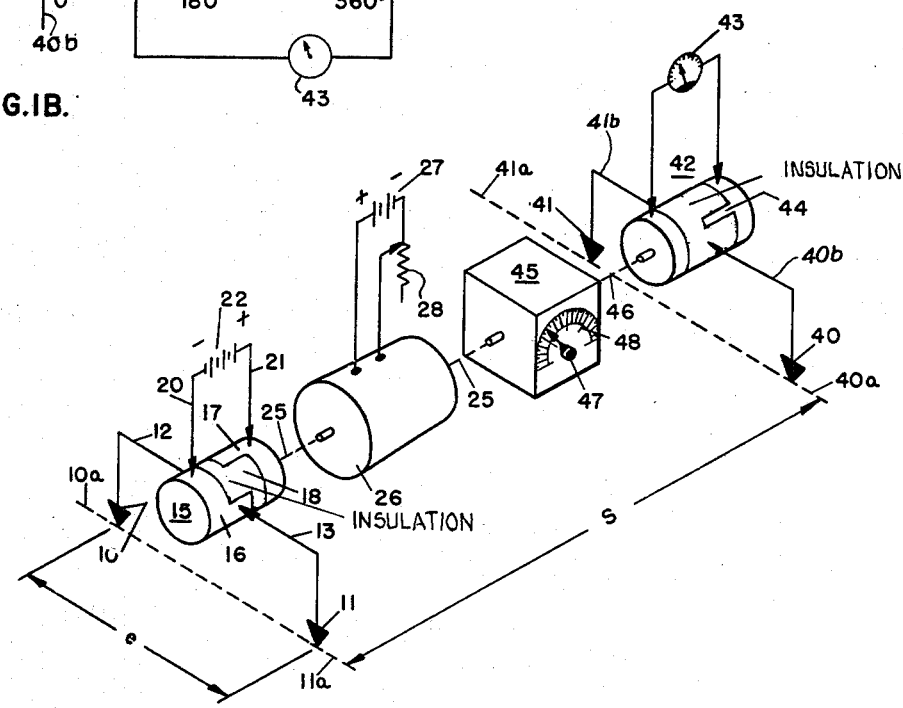
FIG.1
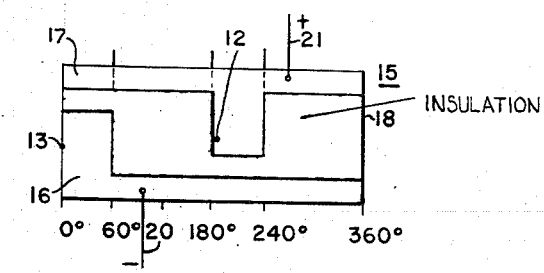
FIG.IA.
WILLIAM J. YOST
*INVENTOR.*
BY D. Carl Richards
*AGENT*

July 27, 1954 W. J. YOST 2,685,058
GEOPHYSICAL EXPLORATION BY ELECTRIC PULSES
Filed Aug. 27, 1949 4 Sheets-Sheet 4

WILLIAM J. YOST
INVENTOR.

BY D. Carl Richards
AGENT

Patented July 27, 1954

2,685,058

UNITED STATES PATENT OFFICE 2,685,058

GEOPHYSICAL EXPLORATION BY ELECTRIC PULSES

William J. Yost, Dallas, Tex., assignor, by mesne assignments, to Socony-Vacuum Oil Company, Incorporated, New York, N. Y., a corporation of New York Application August 27, 1949, Serial No. 112,822

18 Claims. (Cl. 324—1)

This invention relates to electrical prospecting methods wherein current pulses are applied to the earth's surface and potentials resulting from the application of the current pulses are measured and more particularly to the measurement of the effect on the resulting potentials of energy reflected from subsurface reflecting horizons.

In certain electrical prospecting methods, current pulses are applied to the earth's surface at a selected location and the potentials appearing at a location spaced from the point of application of the current pulses are measured. There are various systems known in the art for applying the pulses to the earth. Further, various parameters such as the average voltage in the interval between pulses, the time rate of increase of the potential, etc., have been measured. Extreme difficulty is encountered, however, in measuring the magnitude of the reflected energy per se since it is small compared with both direct waves travelling along the earth's surface and the level of noise energy encountered in making such measurements.

It has been found that for certain orientations of the exploring apparatus on the earth's surface the measured potential may definitely be shown to include energy reflected from a depth in the earth. The effect of the reflected energy has been found to be a convenient measurable parameter for the delineation of subsurface structural variations.

In accordance with the present invention, periodic current pulses are applied to the earth's surface through either an electric or magnetic dipole. The tangential component of the field resulting from the application of the pulses is measured, preferably for a short measuring interval. The phase angle or time-occurrence between the measuring interval and the application of the current pulse is varied in order to determine the phase relations of characteristic transition points in this component of the field. The time occurrence of or the phase angles between a selected point on the applied pulses and characteristic transition points in the aforesaid field are taken progressively at selected stations along a traverse to detect variations in subsurface structures.

For a more complete description of the invention and for further objects and advantages thereof, reference may now be had to the accompanying drawings in which:

Fig. 1 is a diagrammatic representation of an exploring system including a commutator unit for applying current pulses and measuring resultant potentials;

Fig. 1A is a developed view of the commutator 15 of Fig. 1;

Fig. 1B is a developed view of the commutator 42 of Fig. 1.

Figure 2:
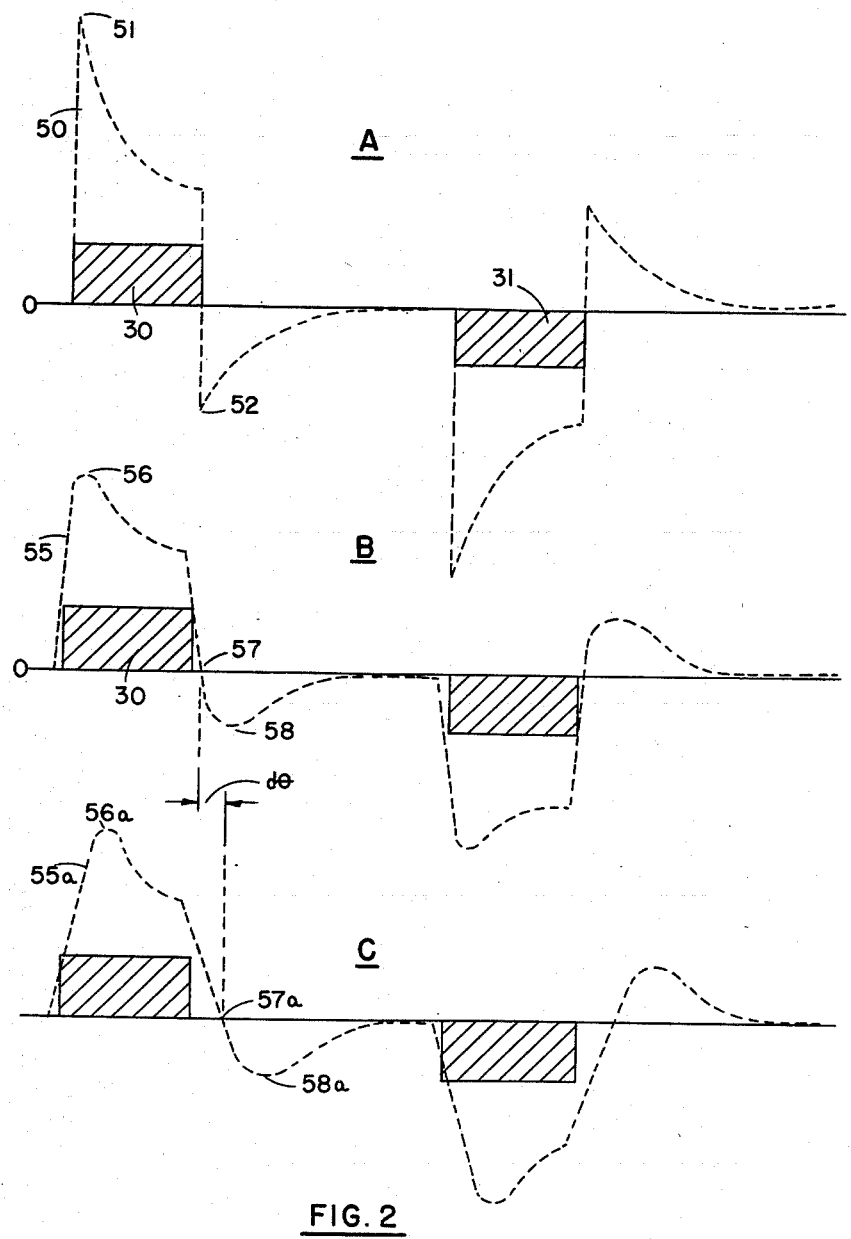
Fig. 2 illustrates wave forms received at potential electrodes for the system of Fig. 1.

The present invention is illustrated in one form in Fig. 1 utilizing a system similar to but not the same as that disclosed in Clewell Patent No. 2,454,911.

Electrodes 10 and 11 are buried in the surface of the earth and are connected by way of conductors 12 and 13 to a commutating element 15. The commutator 15 includes two cylindrical conducting elements 16 and 17 which are separated by a cylindrical insulating member 18. The conductors 12 and 13 are connected to brush terminals positioned for contact with the surface of the commutator 15. As shown in Fig. 1A, the conducting elements 16 and 17 and the insulating member 18 are shaped so that, upon rotation of the commutator, the brush terminals connected to conductors 12 and 13 are alternately in contact with the elements 16 and 17. The brush terminals of conductors 20 and 21 serve to apply a voltage from a battery 22 or other suitable source of direct current to the circumferentially continuous portions of the conducting elements 16 and 17 of commutator 15, and thence to conductors 12 and 13 and the electrodes 10 and 11. The commutator 15 is mechanically coupled by way of shaft 25 to a variable speed motor 26. A source of power generically represented by battery 27 supplies electrical energy to the motor 26. The potentiometer 28 in the energizing circuit of motor 26 represents means for controlling the speed of rotation of the motor and the associated commutator 15.

Upon rotation of the commutator 15 by motor 26, periodic rectangular current pulses alternately of opposite polarity flow in conductors 12 and 13. These pulses are abruptly initiated and terminated. For the position of the commutator illustrated in Fig. 1 the negative terminal of battery 22 is connected by way of conductor 20, commutator segment 16 and conductor 13 to electrode 11. In a similar manner, the positive terminal of battery 22 is connected through conductor 21 and commutator element 17 to conductor 12 and thence to electrode 10. When the commutator has been rotated 180° from the position shown in Figs. 1 and 1A, the line 20 will be connected to line 12 while line 13 will be connected to the positive supply line 21. Thus the commutator periodically reverses the connections from battery 22 to electrodes 10a and 11. A typical wave form of the alternating current flowing in the conductors 12 and 13 is illustrated in Fig. 2 where a positive pulse 30, 60° in length (cross-hatched), is followed by a 120° interval which in turn is followed by a negative pulse 31, 60° in length and a second interval 120° in length.

Potential electrodes 40 and 41, Fig. 1, are connected by way of conductors 40b and 41b to a commutator 42. The difference in potential appearing between the electrodes 40 and 41 is applied to a long time-constant measuring means such as a galvanometer 43 or its equivalent from the commutator 42. The commutator 42 is driven from motor 26 in synchronism with or at the same speed as commutator 15 neglecting changes during phasing control operations described below. A differential or phase control 45 of suitable type is interposed in the drive between motor 26 and commutator 42 to provide a convenient means for adjusting the relative angular position between commutators 15 and 42. More particularly, the differential 45 of conventional type, is driven by shaft 25 and transmits a torque to shaft 46 which carries commutator 42. A suitable control 47 is provided to vary the relative angular positions of shafts 25 and 46.

In accordance with the present invention, potentials appearing between electrodes 40 and 41 are applied to the galvanometer 43 for a relatively short period during each cycle. The conducting segments 44 and 44a of the commutator 42 are constructed to occupy but a small portion of the circumference of the commutator 42. The potential applied through commutator 42 to and read on galvanometer 43 is the integrated sum of all waves reaching the potential electrode location during the measuring period. The voltage of relatively short duration is repeatedly applied, once during each one-half cycle, to the long period galvanometer 43, and by a number of applications produces a galvanometer deflection which approaches a value proportional to the maximum value of the voltage. As a general rule, the applied voltage includes noise components in addition to components attributable to flow of the periodic current pulses in the radiating conductors 12 and 13. It is to be noted, however, that since noise voltages are random in their occurrence and polarity, their average value is zero over a long period of time. Accordingly, the longer the period of the galvanometer 43 or an equivalent measuring device the greater the reduction in the noise components. One galvanometer which has been used in the system of Fig. 1, having a period of two seconds and sensitivity in the range of .01 microamps/millimeter deflection is the "D. C. Spotlight Galvanometer" #3402–H sold by the Rubicon Company of Philadelphia, Pennsylvania. By making a series of observations at each of a plurality of short, closely spaced time intervals in synchronism with, and throughout the duration of the input current pulse, data (galvanometer readings) may be obtained which describe, point by point, throughout an entire cycle, the character of the resulting pattern or wave shape of the electric field at the detecting location.

There are two effects of current flow to and from the commutator 15. The conductors 12 and 13 form a dipole from which electric energy is radiated. The electric field produced by the current pulses in conductors 12 and 13, accordingly, corresponds with that produced upon excitation of a dipole oriented parallel to the surface of the earth in accordance with well understood theory as applied to radio antennas. In this connection, it is to be noted that the pulses are at least abruptly initiated, or abruptly terminated and are produced at a relatively low frequency, generally below 30 cycles per second. Thus, phase changes which in the radio frequency range would impose limitations upon the points of connection of the excitation source to the dipole do not arise with the dipole formed by conductors 12 and 13. Accordingly, the commutator 15 may be positioned centrally of the dipole as shown in Fig. 1, or it may be located at any point along the combined lengths of conductors 12 and 13. The detecting or potential electrodes 40 and 41 are disposed on the line 40a—41a which is parallel to the line 10a—11a. Hence the electrodes 40 and 41 are disposed on a line which is perpendicular to and bisected by a radial which may be drawn from the center of the dipole 12, 13 to the center of the line between detecting electrodes 40, 41. Accordingly, the detecting electrodes measure the tangential component of the electric field produced by the dipole 12, 13; that is, the component of the field parallel to its wave-front.

The second effect produced by current flow to and from the dipole 12—13 is the production of subsurface electromagnetic waves which are reflected by subsurface resistive interfaces. The subsurface waves travel more slowly through the earth and reflected energy thus is delayed in its arrival at the detecting electrodes 40 and 41 where a voltage in the resulting potential pattern is detected.

At the detector, the difference in potential between electrodes 40 and 41 divided by the distance between them will be a direct measure of the intensity of the electric field between them. As the distance S of Fig. 1 increases, the electric field established by the current flowing in the dipole formed by conductors 12 and 13 decreases at a relatively slow rate, i. e., as the inverse of the first power of the distance traveled, the distance S, for energy traveling along the surface between the dipole 12—13 and the electrodes 40 and 41. This decrease is dependent upon change in the distance S.

The electric field at the detecting electrodes which arises due to the current impulses applied to the earth by electrodes 10 and 11 depends upon change in the resistivity of the earth and is also dependent upon change in distance S. Since the earth forms a conductor of infinite area there is distributed flow of current between electrodes 10 and 11. The electric field, due to flow of current through the earth, appearing between electrodes 40 and 41, decreases at a much greater rate with increasing values of S, i. e., inversely as the cube of the distance S as compared with the radiation component. Therefore the effect of current flow in the earth between electrodes 10 and 11 may be neglected in the present invention because electrodes 40 and 41 are located a relatively great distance from electrodes 10 and 11.

If the earth be considered as homogeneous, the signal at the detecting electrodes may be considered to be comprised entirely of a "boundary wave" which travels along the surface of the earth-air interface at a relatively high velocity approaching the velocity of light. Where the earth is not homogeneous, the signal at the detecting electrodes will be a combination of that due to the boundary wave and that due to reflection of energy from subsurface resistive interfaces.

Reference may be had to the electromagnetic theory of radiation of energy from the concept of an elemental dipole for a further understanding of certain theoretical aspects of the invention, such theory being briefly set forth in the book entitled Reference Data for Radio Engineers, 2nd Ed., 1946, published by the Federal Telephone and Radio Corporation, particularly chapter 13, page 250. An elemental dipole may be substituted for the dipole formed by conductors 12 and 13, such theoretical elemental dipole being located midway between the combined lengths of conductors 12 and 13. Such a dipole will produce an effect of the same character as conductors 12 and 13 with similar excitation. Thus, conductors 12 and 13 acting as radiators of electromagnetic energy are equivalent to a great number of theoretical elemental dipoles oriented in an end-to-end array.

In accordance with the invention, the dipole 12, 13 at the sending station generates waves traveling in all directions. The potential electrodes 40 and 41, of course, detect the sum of the waves traveling by way of all paths to the receiving station, and, as will be later explained more in detail, the wave shape of the electric field or the potential pattern of the pulses appearing at electrodes 40 and 41 is determined. The shape of that pattern will be affected by subsurface interfaces, and by determining its shape or characteristic transition points thereof useful information is obtained as to the location of such interfaces.

It has been found that the wave shape of the electric field is controlled to a considerable extent by the relative orientation of current and potential electrodes. The orientation of Fig. 1 may, for simplicity, be termed an H-spread which is essentially a rectangular configuration in which the conductors or cables 12 and 13 lie along line 10a—11a at one end of the rectangle. Line 10a—11a is parallel to the line 40a—41a at the other end of the rectangle on which the potential electrodes 40 and 41 are located. With such an orientation, the electrodes 40—41 detect the aforementioned tangential component of the electric field generated by the current flowing in conductors 12 and 13.

A theoretical boundary wave for an H-spread of Fig. 1 is illustrated in Fig. 2 at A. Upon application of the current pulse 30, a potential immediately appears at the detecting electrodes 40—41. The potential rises instantaneously to a positive maximum 51 followed by an approximately exponential decay until the time of termination of the pulse 30. Thereupon, the tangential component of the electric field at the detecting electrodes immediately reaches a negative maximum 52 which is followed by an approximately exponential decay approaching the zero axis. The subsequent half cycle beginning with the application of the negative pulse 31 is similar to the preceding half. This wave shape may be and was calculated from electromagnetic theory with the assumption that there is no reflected energy (homogeneous mediums) and that the electric field is described completely by the conditions at an infinite boundary between homogeneous earth and the air.

The potential pattern 51 may be measured as above explained by the galvanometer 43, Fig. 1. The potential detected between electrodes 40 and 41 is applied to the galvanometer when the segment 44 is in circuit with electrode 40 and a similar segment 44a not seen in Fig. 1 but shown in Fig. 1B is in circuit with electrode 41 for a period or measuring angle preferably small compared to the length of a cycle of the applied pulses. A measuring angle of 20° has been found to be satisfactory, i. e., each of the segments 44 and 44a occupies 20° of the 360° periphery of the commutator 42.

The pattern 55 actually measured by the system of Fig. 1, is illustrated at B, Fig. 2. The phase control unit 45 is successively adjusted so that measurements are made at 5° intervals through the entire cycle of the applied current pulse and the magnitude or the average of the potential for the 20° measuring interval plotted at each 5° point to produce the pattern 55. Due to the length of the measuring angle, the pattern 50 at A, Fig. 2, appears as the slightly modified pattern 55 at B, Fig. 2. More particularly, the potential begins to rise and is plotted slightly ahead of the instant of application of the current pulse 30, simply because the measured potential is plotted at the center of the measuring angle and the measuring angle is of finite length. The potential pattern 55 reaches a positive peak 56 of less distinctive character than the theoretical peak 51 and thereafter exponentially approaches zero. Upon termination of the pulse 30, the potential passes through zero at point 57, at a time following the termination of the pulse, reaches a negative maximum 58, and thereafter approaches zero.

Three characteristic transition points or voltage transitions on the curve are affected to a measurable degree by reflected energy and each transition point is measured using the system of Fig. 1. A "voltage transition" or "transition point" as used in the present description is to be taken to mean a transition or a change in the polarity of a voltage or a change in the sign of the slope of a wave form corresponding with such voltage. The three voltage transitions are: (1) point 56, which is the transition from positive slope to negative slope; (2) point 57, which is the transition from a positive voltage to a negative voltage, and finally (3), point 58 which is transition from a negative slope to a positive slope. It has been found that with respect to the instant of application of the current pulse the time-occurrence of the transition points varies in a manner depending upon the presence or absence of reflected waves as will later be explained in further detail.

Figure 3:
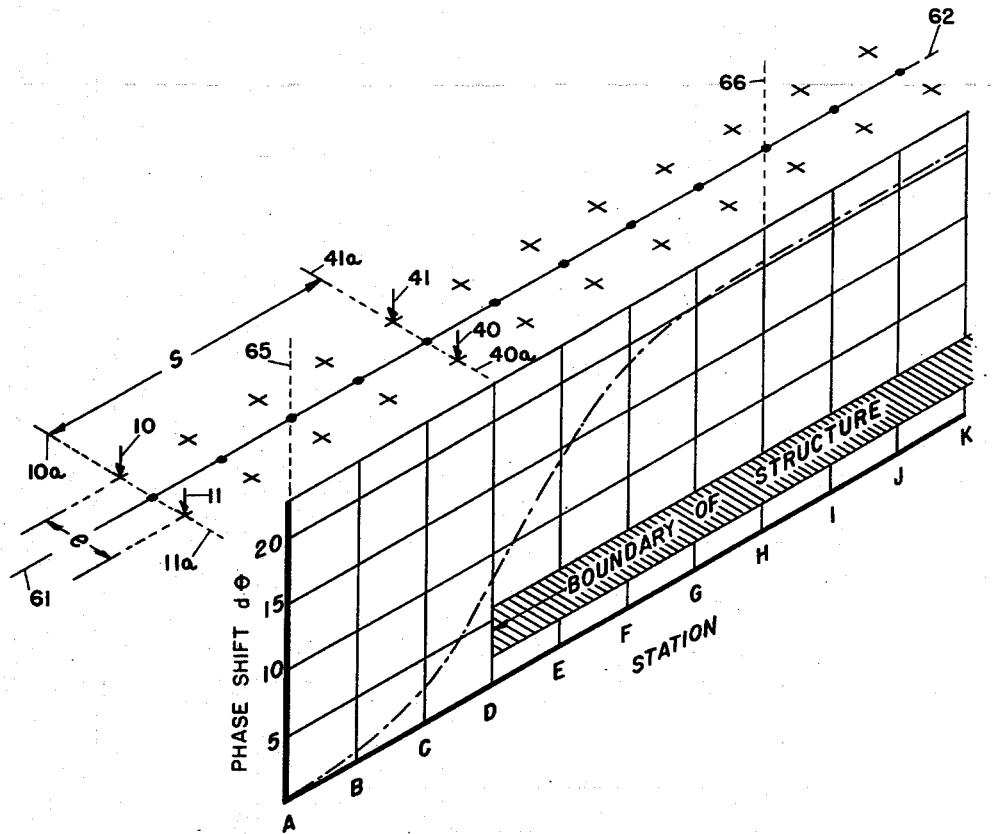
Fig. 3 is a plot of the phase shift for a traverse over a known structure using the system of Fig. 1.

The actual measurement of the time occurrence of the transition points above noted will preferably be made at points along a line or traverse of interest in the following manner. Referring to Fig. 3, a traverse 61—62 is selected in an area in which a survey is to be made. The line 10a—11a on which electrodes 10 and 11 are positioned is preferably orientated prependicularly to and bisected by the traverse 61—62. It has been found suitable to provide a dipole length or electrode spacing e of 500 feet. The line 40a—41a upon which electrodes 40 and 41 are located likewise is bisected perpendicularly by the traverse line 61—62. Where the electrode spacing e is 500 feet, a spread distance s of 2,000 to 3,000 feet has been found satisfactory, it being understood, of course, that the motor and the associated apparatus driven by it as shown in Fig. 1 will be located at one station while conductors will extend from one of the commutators to the remotely located station, such, for example, as has been illustrated in Fig. 6.

With the exploring apparatus thus oriented, motor 26, Fig. 1, is energized, driving the commutators 15 and 42 at a selected frequency, preferably within the range of ½ to 30 cycles per second. Thereafter the phase angle or time occurrence of one or all of the three transition points will be measured by varying the relative angular position of the circuit controlling members or commutator elements 15 and 42 while observing the galvanometer 43. More particulaly the control knob 47 of the differential 45 is effective upon rotation to change the aforementioned relative angular position through a total angle of 360°. The system is so adjusted that when the pointer carried by knob 47 is at zero on scale 48 the exiting circuit and the detecting circuit are closed at precisely the same instant in each cycle of the periodic pulses. The phase angle or relative time of closure of the detecting circuit with respect to time of closure of the exciting circuit may then be varied by rotation of knob 47 to any point in the period of the current pulses. Also, at the upper end of scale 48 the exciting and detecting circuits will be closed simultaneously. Scale 48 may then be calibrated to give a direct reading of the phase angle of closure of the detecting circuit to the galvanometer 43 taking the instant of closure of the exciting circuit from battery 22 as the zero reference.

If it is desired to obtain data to plot the complete wave shape of the detected potential, the pointer carried by knob 47 is set at zero and motor 26 is energized. The deflection of the galvanometer 43 is then recorded. The control knob 47 is then rotated to the 5° point on scale 48 and the galvanometer reading again recorded. The procedure will thus be repeated at each 5° point throughout the entire length of scale 48. With data thus obtained, a substantially complete potential pattern such as illustrated by the wave form 50 of Fig. 2 may be plotted. If it is desired only to measure or determine the phase angle $d\theta$ for one or all of the three transition points the knob 47 will be varied slowly from zero to full scale while observing the deflection of galvanometer 43. The occurrence of galvanometer maxima or minima may be noted and corresponding phase angels recorded. At a phase angle immediately following the application of a current pulse, a galvanometer maximum will be noted as having the same polarity as the applied pulse which identifies transition point 56, Fig. 2. At the terminaton of the pulse or immediately thereafter, a zero potential or a null reading will be observed on the galvanometer which locates the transition point 57. This will be followed, if the phase angle is further increased, by the occurrence of the negative maximum or the transition point 58.

Patterns similar to the curve 55, Fig. 2, have been obtained in areas where, from all available geological information, there was no evidence of substantial subsurface discontinuities or anomalies. In such non-anomalous areas, point 56 is found to be closely associated or coincident with the application of the current pulse and is the result of boundary wave energy travelling along the air-earth interface at a very high velocity. Points 57 and 58 are closely associated with the termination of the pulse. At such an off-structure location, all three of the foregoing measured phase angles are relatively smaller than at locations over a reflecting subsurface bed. Stated otherwise, the potential pattern 55, Fig. 2, detected at an off-structure location is one substantially entirely made up of the aforementioned boundary wave.

For convenience, the time-occurrence or phase angle at which a transition point occurs in a measurement made at an off structure or non-anomalous location may be used as a zero reference. Then as measurements are made at other stations, the change in the angle denoted by $d\theta$, Fig. 2, and obtained from scale 48, may be used as the measured parameter and variations in $d\theta$ taken as an indication of subsurface structural variations. For example in Fig. 3, a zero phase angle is plotted for a representative transition point at an off-structure station 65 which for convenience is plotted at a point along the traverse determined by the geometrical center of the rectangle described by the four electrodes 10, 11, 40 and 41. As the exploring apparatus is progressively moved in 500 foot steps or intervals from the off-structure station 65 to a location or station 66 where all of the exploring apparatus is over a structure, the transition points 56, 57, and 58, illustrated in Fig. 2 are found to have occurred at later times or greater phase angles than were observed at off-structure stations. More particularly, as illustrated at C, Fig. 2, the curve 55a may be taken as the exemplary of the potential pattern obtained with the exploring apparatus located wholly over a structure. The time occurrence of either the transition point 56a, the null 57a, or the transition point 58a is later than for corresponding measurements taken at station 65. Since electromagnetic waves travelling down into the earth (rather than along the surface) have a low velocity in the order of 25,000 feet per second, depending in part upon the resistivity of the earth and the frequency of the waves, the observed delay can be attributed directly to the presence of a reflecting subsurface structure. Stated otherwise, there is a portion of the field that is comprised of high velocity boundary wave energy and additionally some lower velocity reflected energy, the latter arriving at the surface at some time after the former, depending upon the velocity and the depth to which the reflected energy travelled.

In Fig. 3, the delay angle $d\theta$ has been plotted for a series of stations (A to K) leading over a known subsurface structure. The presence of the structure is distinctly shown by the rapid increase in the delay angle or the phase shift of the transition points. It will be apparent that the measurement of the null point 57a, Fig. 2C, may be made more accurately than measurement of maxima 56a or 58a as is characteristic of null measurements and is therefore preferred.

Figure 4:
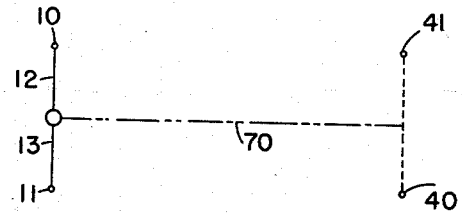
Fig. 4 is a plan view of the spread configuration of Figs. 1 and 3.
Figure 5:
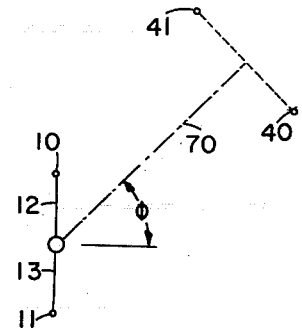
Fig. 5 is a modification of Fig. 4.

The H-spread of Figs. 1 and 3 is diagrammatically illustrated in the plan view of Fig. 4, with the conductors extending between the receiving electrodes 40 and 41 omitted. It will be understood such conductors may be provided, one example being shown in Fig. 6. Electrodes 10, 11, 40, and 41 are oriented at the corners of a rectangle. The conductors 12 and 13 are positioned along one end of a rectangle with the detecting electrodes at the corners on the opposite end of the rectangle. With this orientation the potential appearing between electrodes 40 and 41 is the tangential component of the electric field established by flow of current in conductors 12 and 13. As above pointed out, at large distances away, the conductors 12 and 13 may be considered to be the same as an elemental dipole located at their center. The elemental dipole is oriented in a plane parallel to the earth's surface. In Fig. 1, the electrodes 40 and 41 are positioned on a line that is perpendicular to a radial line extending from the center of conductors 12 and 13. Hence, they detect the tangential component of the electric field. Another orientation of the electrodes is illustrated in Fig. 5 where the electrodes are oriented on a line perpendicular to and bisected by a radial, such as line 70, extending from the center of the current dipole. In Fig. 5, the radial 70 is at an angle $\phi$ of 45° with respect to the dipole formed by the conductors 12 and 13. The potential electrodes 40 and 41, oriented on a line perpendicular to radial 70 detect the tangential component of the electric field but the amplitude is reduced by a factor equal to the cosine of $\phi$ (i. e., 0.707). Thus, as a practical matter, the angle $\phi$ may be any angle less than ±90° and is limited only because at 90° the tangential component of the electric field is zero. It will be observed that where $\phi = 0$ the potential is a maximum, and therefore represents the preferred arrangement for the measurements.

The foregoing description has considered the measurement of the tangential component of the electric field. There will now be described a system for measuring corresponding transition points in the tangential component of the magnetic field from a radiating magnetic dipole. For example, a magnetic dipole in the form of a loop 71 illustrated in Fig. 6 may be utilized for generation of such a field. A similar potential loop 72 positioned on and parallel to the earth's surface is used to detect the field. Loops 71 and 72 and the spacing between them may have dimensions of the same order of magnitude as used with the electric dipole of Fig. 3. The loops may be 500 feet to 1000 feet in diameter and spaced with their centers 2000 feet to 4000 feet apart. The loops will be connected to a commutating-measuring system 73 of the type previously described. However, since the use of loops inherently eliminates the problem of polarization encountered in electrode spreads, unidirectional pulses 74, Fig. 7, may be used. Such current pulses flowing in the magnetic dipole or loop 71 are inductively applied to the earth and cause a potential to be induced in loop 72. At any given instant, a vector representing the magnetic field produced by flow of current in the horizontal loop 71 is vertical. The loop 72 detects the component of the magnetic field parallel to the aforementioned vector and thus detects the tangential component of the magnetic field. The wave form 75 is representative of the tangential component of the magnetic field detected at an "on structure" location.

Figure 7:
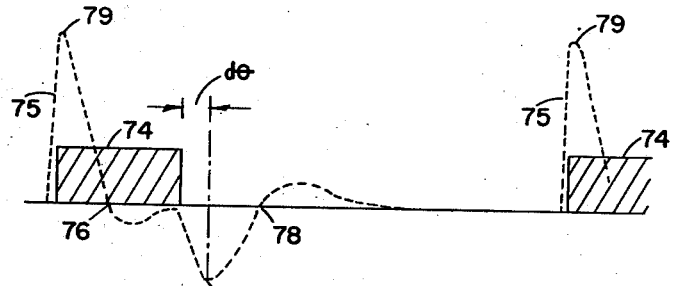
Fig. 7 is a plot of wave forms measured using the system of Fig. 6.

The detected wave form 75 of Fig. 7 is substantially the same as would be obtained by mechanically or mathematically differentiating the pattern 55a of Fig. 2. Thus, each of the transition points 56a, 57a and 58a of Fig. 2 has a characteristic measurable counterpart in the pattern 75 of Fig. 7. More particularly, the zero transition point 76 corresponds with the positive maximum 56a of Fig. 2. Similarly, the negative maximum 77 and the zero point 78 correspond with the zero point 57a and the negative maximum 58a, respectively.

For a given frequency, each of the characteristic transition points 76, 77, and 78 will be found to shift in their time occurrence as the spread is moved from an off-structure location to an on-structure location. In general their phase angle, measured with reference to either the leading or trailing edge of each current pulse or to some other known point with respect to the pulses, will change as measurements progressively are made from off of a structure to over a structure. This is not true, however, in the case of the positive maximum 79 for the reason that it is associated primarily with the arrival at the detector location of the high velocity boundary wave and is relatively unaffected by the later arriving slower velocity reflected waves.

Figure 6:
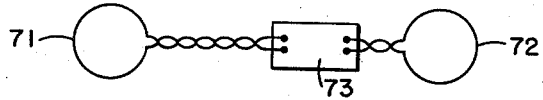
Fig. 6 illustrates a further modification of the present invention.

A "dipole" as used in the present description is an electromagnetic radiating element that produces an effect at the measuring or observing point that is the same in character as would be produced by a theoretical elemental dipole positioned at the same location as the radiating element. Thus, in Fig. 1 conductors 12 and 13 form an electric dipole that corresponds to an elemental electric dipole at the center thereof positioned with its axis parallel to the earth's surface. In Fig. 6 loop 71 produces an effect the same as produced by an elemental magnetic dipole positioned at the center of loop 71 with its axis vertical.

The term "current pulses" is used to designate current flow characterized by an abrupt change from a maximum value to a minimum or zero value or vice versa, or both, as in the case of the rectangular current impulses shown in Fig. 2.

The term "tangential component" of the field is that component of the field represented by a vector tangential to a circle whose center is at the location of and which lies in the plane as the radiating dipole.

The aforementioned measurements of the tangential component of the field were made in one instance along a traverse extending over a salt dome on which extensive drilling made available an accurate outline of the structure. The dome was one mile across, having a relatively flat top 1,000 feet beneath the earth's surface. Phase angles ($d\theta$) as great as 40° in the tangential component of the electric field were encountered while proceeding as abovedescribed from an "off-structure" to an "on-structure" station. The magnitude of the measured or observed phase angle will in any case depend upon the magnitude of the reflected wave compared to that of the boundary wave. The magnitude of the reflected wave is a function of the resistivity of the earth, the contrast in resistivities at a reflecting interface, and the depth of the point of reflection. Since the measurement of the null points in the tangential component of either the electric or magnetic field may be made with considerable accuracy, much smaller phase angles than the above observed 40° angles may be utilized to advantage in determining variations in subsurface structures. Thus, variations deeper than the aforementioned 1,000 feet may be detected by applying periodic pulses to the earth's surface, detecting the tangential component of the resulting field, and measuring the phase angle between a selected reference, as the beginning or end or a selected point on the pulses, and one or all of the transition points.

The current pulses of Fig. 2 are illustrated as being 60° long followed by a 120° gap therebetween. There is no particular restriction upon the pulse length except that it is desirable to use pulses at least as long as the measuring period. In a system using a 20° measuring period, current pulses have been utilized in the range of from 20° to 100° long. In that system, for current pulses applied to the conductors 12 and 13 in the order of 2 amperes, the boundary wave potentials were in the order of 1 millivolt.

The form of commutator illustrated in Fig. 1 has been here adopted for the purpose of simplicity. It is to be understood that various commutating schemes known in the art may be used to apply the periodic pulses to the earth either by way of the electric dipole of Fig. 1, or the magnetic dipole of Fig. 6.

Though the invention has been illustrated by certain modifications thereof, it will be apparent that other and further modifications within the scope of the invention as set forth in the appended claims may now suggest themselves to those skilled in the art.

What is claimed is:

1. An electrical prospecting system comprising an electric dipole positioned at and parallel to the surface of the earth, means for applying to said dipole periodic current pulses of abruptly changing magnitude for electromagnetically coupling said dipole to said earth, a potential circuit including means for detecting the tangential component of the electric field resulting from application of said current pulses to said electric dipole, and means for measuring the phase angles between a selected reference point in the time-occurrence of said pulses and the time-occurrence of a magnitude of said field representative of a transsition point in said tangential component of said field.

2. An electrical prospecting system comprising a magnetic dipole positioned at the surface of the earth, means for applying abruptly changing periodic current pulses to said magnetic dipole for electromagnetically coupling said dipole to said earth, a potential circuit including means for detecting the tangential component of the magnetic field resulting from application of said pulses to said magnetic dipole, and means for measuring the phase angles between the time-occurrence of transition amplitudes of said tangential component of said field and a reference-time selected with respect to the time-occurrence of said pulses.

3. An electrical prospecting system comprising grounded radiating conductors positioned along one end of a rectangular spread configuration, means for applying periodic current pulses to said radiating conductors for generating surface and subsurface waves travelling therefrom, potential detecting means positioned at the other end of said rectangle, a circuit connected to said potential detecting means including means for measuring the sum of said waves for a short measuring period, and means for varying the phase of said measuring period with respect to a selected time of application of said periodic pulses to said radiating conductors to determine the phase angle of transition points in said detected sum.

4. An electrical prospecting system comprising a commutator having at least two circuit controlling members and means for varying the relative angular position of said circuit controlling members, a dipole positioned at a sending station adjacent the earth, a source of potential connected to one of said members and to said dipole for producing in said dipole a cyclic flow of abruptly changing current pulses each of predetermined time-duration in said dipole upon operation of said commutator for establishing an electromagnetic field in the earth, detecting means positioned adjacent the earth at a receiving station spaced from said sending station and connected to the second of said circuit controlling members, said second circuit controlling member being characterized by circuit completing means operative for an interval short compared with the time-duration of each of said pulses, a galvanometer connected to said second circuit controlling member for measurement of potentials applied thereto during said short measuring interval, and means associated with said phase varying means for measuring the phase angle between the beginning of current flow in said radiating dipole and the occurrence of potential maxima and minima in the potentials detected and applied to said galvanometer.

5. An electrical prospecting system comprising a source of current, circuit controlling member, a radiating dipole positioned at the surface of the earth and connected to said source of current and to said circuit controlling member, means for actuating said circuit controlling member for flow of periodic, abruptly changing, current pulses in said dipole to establish an electromagnetic field in the earth, detecting means spaced from the location of said dipole oriented for detection of the tangential component of the field resulting from flow of said current pulses in said dipole, a second circuit controlling member connected to said last named means and characterized by circuit completing elements operative for an interval short compared with the period of said periodic current pulses, long period measuring means connected to said second circuit member to measure the amplitude of said tangential component during said short interval and to eliminate noise voltages in said detecting means, and a variable phase coupling means between said circuit controlling members for varying the relative phase positions thereof for measurement of maxima and minima potentials in said detecting means resulting from said periodic current pulses.

6. The method of electrical prospecting which comprises periodically applying to the earth at a transmitting station current pulses having at least one region of abrupt change of current level which give rise to electrical surface waves and sub-surface waves, at a receiving station spaced from said transmitting station detecting a potential in a potential pattern of the tangential component of the field produced at said receiving station by the sum of said waves, said pattern having transition points where the sum of said waves is maximum, in a negative direction, and where said sum is zero, varying the time at which said potential is detected relative to the time-occurrence of said current pulses, integrating during production of a plurality of said pulses the potential detected at a transition point to minimize the effect of random-occurring potentials not due to said pulses, and measuring the time spacing between a selected reference time in the time-occurrence of said current pulses and said potential detected at a selected transition point of said potential pattern.

7. An electrical prospecting system comprising two electrical conductors disposed in a substantially end-to-end relation and grounded at opposite ends, electrical means for applying periodic current pulses to adjacent ends of said conductors for simultaneous production of electrical surface waves along the air-earth interface and electrical subsurface waves affected by subsurface interfaces, detecting means located a distance from said conductors for measuring a potential in a potential pattern produced by the sum of said waves, and means for varying relative to said pattern the measurement of the detected potential for determination of the phase relation of a transition point relative to said periodic pulses.

8. In electrical prospecting utilizing an electric dipole positioned at the earth's surface, the method which comprises applying to said dipole periodic current pulses of abruptly changing magnitude, detecting the tangential component of the electric field generated by radiation of electromagnetic energy from said dipole during application of said pulses and within a measuring period short compared to the period of said current pulses, varying the time-position of said measuring period relative to the time-position of said current pulses, and measuring with respect to the time-position of said current pulses the time-occurrence of a positive maximum voltage of said tangential component.

9. In electrical prospecting utilizing an electric dipole positioned at the earth's surface, the method which comprises applying to said dipole periodic current pulses of abruptly changing magnitude, detecting the tangential component of the electric field generated by radiation of electromagnetic energy from said dipole during application of said pulses and within a measuring period short compared to the period of said current pulses, varying the time-position of said measuring period relative to the time-position of said current pulses, and measuring with respect to the time-position of said current pulses the time-occurrence of zero voltage of said tangential component.

10. In electrical prospecting utilizing a magnetic dipole positioned at the earth's surface, the method which comprises applying to said magnetic dipole periodic current pulses of abruptly changing magnitude for electromagnetically coupling said dipole to said earth, detecting the tangential component of the magnetic field established in said earth by said pulses during application of said pulses and within a measuring period short compared to the period of said current pulses, varying the time-position of said measuring period relative to the time-position of said current pulses, and measuring with respect to the time-position of said current pulses the time-occurrence of zero voltage of said tangential component.

11. An electrical prospecting system comprising means for applying to the surface of the earth at a selected location current pulses of abruptly changing magnitude to produce surface waves and subsurface waves, means for detecting at a different location the tangential component of the field resulting from production of said waves at said selected location, and means for measuring with respect to the time-occurrence of said pulses the time-occurrence of a voltage transition in said tangential component of said field.

12. An electrical prospecting system comprising a dipole positioned at the earth's surface at a selected location, means for applying to said dipole current pulses of abruptly changing magnitude for producing at a distance therefrom a field having values representative of transition points whose phases relative to said pulses are determined by the character of subsurface formations, means for detecting at a distance from said dipole the tangential component of said field, a circuit including measuring means connected to said detecting means for measuring the magnitude of said tangential component during a measuring period short compared to the period of said pulses means for varying the relative time-position between said measuring period and the time-position of said current pulses for response of said measuring means to a magnitude of said field representative of at least one of said transition points, and means for measuring the change between said time-positions required to produce response of said measuring means to said magnitude of said field representative of at least said one of said transition points.

13. An electrical prospecting system comprising at a transmitting station elongated electrical conducting means forming a dipole positioned at the surface of the earth, means for applying to said dipole current pulses of abruptly changing magnitude for producing at a distance therefrom a field having values representative of transition points, a potential circuit at a receiving station including means for variably detecting with respect to time the tangential component of said field, and means for measuring the time separation between the time-occurrence of said pulses and the detection of voltage transitions in said tangential component of said field.

14. An electrical prospecting system comprising at a sending station two colinear electrical conductors grounded at opposite ends, means including a current source and commutating means connected to said conductors intermediate the grounded ends thereof for producing therein periodic current pulses of abruptly changing magnitude for generation by said pulses of surface and subsurface waves traveling from said conductors, detecting means connected to said commutating means and including two colinear electrical conductors lying along and grounded at opposite ends on a line perpendicular to a radial line extending from the geometrical midpoint of the electric conductors at said transmitting station for detecting the sum of said surface and subsurface waves, a long period galvanometer connected to said commutating means, and phase adjusting means associated with said commutating means for varying the relative phase between the time-occurrence of said current pulses and the time-occurrence of application of said sum to said galvanometer whereby the phase angle of maxima and minima galvanometer deflections corresponding to the characteristic voltage transitions in said sum may be determined in terms of the setting of said phase adjusting means.

15. In electrical prospecting utilizing a dipole positioned at the earth's surface, the method which comprises applying to said dipole periodic current pulses of abruptly changing magnitude, detecting the tangential component of the field generated by radiation of energy from said dipole during application of said pulses and within a measuring period short compared to the duration-period of each current pulse, establishing each measuring period in the interval between successive pulses, varying the time-position of said measuring period relative to the time-position of said current pulses, and measuring with respect to the time-position of said current pulses the time-occurrence of a transition point in a potential pattern detected during said measuring period.

16. In electrical prospecting utilizing a dipole positioned at the earth's surface, the method which comprises applying to said dipole periodic current pulses of abruptly changing magnitude which give rise to electrical surface waves and subsurface waves, at a receiving station spaced from said transmitting station detecting a potential in a potential pattern of the tangential component of the field produced at the receiving station by the sum of said waves, said pattern having transition points time-displaced one from the other where the sums of said waves are respectively zero and a negative maximum, varying the time at which said potential is detected relative to the time-occurrence of said current pulses, and measuring the time spacing between a selected reference time in the time-occurrence of said current pulses and said potential detected at a selected one of said transition points of said potential pattern.

17. In electrical prospecting utilizing an electric dipole positioned at the earth's surface, the method which comprises applying to said dipole periodic current pulses of abruptly changing magnitude which give rise to electromagnetic surface waves and subsurface waves, at a receiving station spaced from said transmitting station detecting a potential in a potential pattern of the tangential component of the electric field produced at the receiving station by the sum of said waves, said pattern having transition points time-displaced one from the other where the sums of said waves are respectively zero and a maximum both positive and negative, varying the time at which said potential is detected relative to the time-occurrence of said current pulses, and measuring the time spacing between a selected reference time in the time-occurrence of said current pulses and said potential detected at a selected one of said transition points of said potential pattern.

18. In electrical prospecting utilizing a magnetic dipole positioned at the earth's surface, the method which comprises applying to said dipole periodic current pulses of abruptly changing magnitude which give rise to electromagnetic surface waves and subsurface waves, at a receiving station spaced from said transmitting station detecting a potential in a potential pattern of the tangential component of the magnetic field produced at the receiving station by the sum of said waves, said pattern having transition points time-displaced one from the other where the sums of said waves are respectively zero and a negative maximum varying the time at which said potential is detected relative to the time-occurrence of said current pulses, and measuring the time spacing between a selected reference time in the time-occurrnce of said current pulses and said potential detected at a selected one of said transition points of said potential pattern.

References Cited in the file of this patent

UNITED STATES PATENTS

| Number | Name | Date |
| --- | --- | --- |
| 2,035,943 | Broughton-Edge | Mar. 31, 1936 |
| 2,046,436 | Wascheck | July 7, 1936 |
| 2,294,395 | Evjen | Sept. 1, 1942 |
| 2,314,873 | Evjen | Mar. 30, 1943 |
| 2,342,629 | Evjen | Feb. 29, 1944 |
| 2,375,776 | Evjen | May 15, 1945 |
| 2,375,777 | Evjen | May 15, 1945 |
| 2,527,559 | Lindblad | Oct. 31, 1950 |
| 2,535,666 | Broding | Dec. 26, 1950 |
| 2,542,462 | Beard | Feb. 20, 1951 |